United States Patent [19]

Blount

[11] 4,383,049

[45] May 10, 1983

[54] PROCESS FOR THE PRODUCTION OF POLYESTER SILICATE RESINOUS PRODUCTS

[76] Inventor: David H. Blount, 5450 Lea St., San Diego, Calif. 92105

[21] Appl. No.: 397,146

[22] Filed: Jun. 12, 1982

[51] Int. Cl.³ .............................................. C08J 9/00
[52] U.S. Cl. .................................... 521/135; 521/122; 521/136; 521/154; 525/514; 528/73
[58] Field of Search ............... 521/135, 122, 136, 154; 525/514; 528/73

[56] References Cited

U.S. PATENT DOCUMENTS 4,357,463  11/1982  Blount ................................. 528/366

Primary Examiner—Morton Foelak

[57] ABSTRACT

Polyester silicate resinous products are produced by mixing an organic epoxide compound, hydrated silica, Lewis acid and a polycarboxylic acid and/or polycarboxylic acid anhydride, then heating the mixture to from 150° C. to 250° C. for 30 minutes to 4 hours. The polyester is silicate resinous products may be used as a coating agent, as a molding powder and as an adhesive.

9 Claims, No Drawings

PROCESS FOR THE PRODUCTION OF POLYESTER SILICATE RESINOUS PRODUCTS

CROSS-REFERENCE TO RELATED CO-PENDING APPLICATIONS

This application is a divisional of U.S. patent application, Ser. No. 326,842, filed on Dec. 3, 1981, U.S. Pat. No. 4,357,463 which is a continuation-in-part of U.S. patent application, Ser. No. 122,015, filed Feb. 19, 1980, which is a continuation-in-part of U.S. patent application, Ser. No. 10,061, filed Feb. 7, 1979, U.S. Pat. No. 4,200,697, which is a continuation-in-part of U.S. patent application, Ser. No. 794,915, filed on May 9, 1977, now U.S. Pat. No. 4,125,498, which is a continuation-in-part of U.S. patent application, Ser. No. 653,727, filed Jan. 30, 1976, now abandoned, which is a continuation-in-part of U.S. patent application, Ser. No. 562,201, filed on Apr. 14, 1975, now abandoned.

BACKGROUND OF THE INVENTION

This invention relates to a process for the production of polyester resinous products by chemically reacting an organic epoxide compound, an oxidated silicon compound and a polycarboxylic acid and/or a polycarboxylic acid anhydride.

The polyester resinous products may be utilized as a protective coating for wood, metal, plastic, linoleum, leather, fabric and rubber. They may be utilized in paints, lacquers, metal primers, caulking compounds and water-emulsion paints. The unsaturated polyester silicate resinous products, when copolymerized with a polymerizable organic compound, will produce hard, solid, useful objects or they may be used in conjunction with a reinforcing filler such as fiberglas fibers or cloth, paper, wire mesh, etc., to produce a laminate of outstanding strength and durability. They may also be used as a molding powder, as an adhesive and as impregnants. These resinous products may be further reacted with epihalohydrins and polyisocyanate compounds to produce resinous products and foam.

Polyester silicate resinous products may be modified with vegetable oils, vinyl monomers, aminoplasts, phenoplasts, phenol, melamine, silicone resins, silicone silicate resins, cellulose nitrate, cellulose, polyisocyanates, cyclopentadienes, terpenes, mono-basic acids, e.g., benzoic acid and p-tert-butyl benzoic acid; they may be modified with natural resins, ethyl cellulose, chlorinated rubber, aldehyde phenol silicate resins, aldehydes, polyhydroxy compounds and other synthetic and modified natural resins. An excess of hydrated silica may be used to modify the polyester silicate resinous products by making the resin more solvent-resistant and improving its physical strength.

Polyester silicate resinous products may be produced by reacting the following components:
 (a) an oxidated silicon compound;
 (b) an organic epoxide compound;
 (c) a polycarboxylic acid, a polycarboxylic acid anhydride and mixtures thereof;
 (d) a Lewis acid.

Component (a)

Any suitable oxidated silicon compound may be used in this invention. Oxidated silicon acids are preferred such as hydrated silica, silicoformic acid, polysilicic acid, alkali metal silicate, alkaline metal silicate and natural silicate compounds containing free silicic acid groups.

Component (b)

Any suitable organic epoxide compound may be used in this invention. Suitable organic epoxide compounds include, but are not limited to, ethylene oxide, propylene oxide, styrene oxide, butylene oxide, tetrahydrofuran and mixtures thereof. Propylene oxide is the preferred epoxide compound.

Component (c)

The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric acid, fatty acid such as oleic acid, optionally mixed with monomeric fatty acids, dimethylterephthalate and bis-glycol terephthalate.

Long-chain unsaturated alkali metal polyester silicate resins may be made from dibasic acids and dihydric alcohols. Either the dibasic acid or the dihydric alcohol may be unsaturated. Usually a combination of unsaturated and saturated dibasic acids and dihydric alcohols is used to produce the unsaturated polyester resins. Instead of the dibasic acids, the corresponding polycarboxylic acid esters of lower alcohols or their mixtures may be used for preparing the unsaturated polyester resins.

Suitable dibasic acids may be aliphatic, cycloaliphatic, aromatic and/or heterocyclic and may be substituted, e.g., with halogen atoms. Examples of the dibasic acid and corresponding acid anhydride include, but are not limited to, succinic acid, adipic acid, suberic acid, azelaic acid, phthalic acid, sebacic acid, isophthalic acid, trimellitic acid, phthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. An unsaturated dibasic acid such as maleic acid, maleic acid anhydride, fumaric acid, itaconic acid or mixtures thereof must be included in the production of unsaturated alkali metal polyester silicate resins, except when an unsaturated alcohol is used.

Component (d)

Any suitable Lewis acid may be used in this invention. A Lewis acid is any electronacceptor relative to other reagents present in the system. A Lewis acid will tend to accept a pair of electrons furnished by an electron donor (or Lewis base) in the process of forming a chemical compound. A "Lewis acid" is defined for the purpose of this invention as any electron-accepting material relative to the polymer to which it is complexed. It is preferred to use another Lewis acid with the polycarboxylic acid and/or polycarboxylic acid anhydride.

Typical Lewis acids are:

quinones, such as:
  p-benzo-quinone,
  2,5-dichlorobenzoquinone,
  2,6-dichlorobenzoquinone,
  chloranil,
  naphthoquinone-(1,4),
  anthraquinone,
  2-methylanthraquinone,
  1,4-dimethylanthraquinone,
  1-chloroanthraquinone,
  anthraquinone-2-carboxylic acid,
  1,5-dichloroanthraquinone,
  1-chloro-4-nitroanthraquinone,
  phenanthrene-quinone,
  acenaphenequinone,
  pyranthrenequinone,
  chrysenequinone,
  thio-naphthene-quinone,
  anthraquinone-1,8-disulfonic acid and anthraquinone-2-aldehyde;
triphthaloylbenzene-aldehydes such as:
  bromal,
  4-nitrobenzaldehyde,
  2,6-dichlorobenzaldehyde-2,
  ethoxy-1-naphthalidehyde,
  anthracene-9-aldehyde,
  pyrene-3-aldehyde,
  oxindole-3-aldehyde,
  pyridine-2,6-dialdehyde,
  biphenyl-4-aldehyde;
organic phosphonic acids such as:
  4-chloro-2-nitrobenzene-phosphonic acid nitrophenols, such as 4-nitrophenol,
  picric acid;
acid anhydrides, for example:
  acetic-anhydride,
  succinic anhydride,
  maleic anhydride,
  phthalic anhydride,
  tetrachlorophthalic anhydride,
  perylene-3,4,9,10-tetracarboxylic acid and
  chrysene-2,3-8,9-tetracarboxylic anhydride,
  di-bromo maleic acid anhydride;
metal halides of the metals and metalloids of the groups 1B, II through to group VIII of the periodical system, for example:
  aluminum chloride,
  zinc chloride,
  ferric chloride,
  tin tetrachloride,
  (stannic chloride),
  arsenic trichloride,
  stannous chloride,
  antimony pentachloride,
  magnesium chloride,
  magnesium bromide,
  calcium bromide,
  calcium iodide,
  strontium bromide,
  chromic bromide,
  manganous chloride,
  cobaltous chloride,
  cobaltic chloride,
  cupric bromide,
  ceric chloride,
  thorium chloride,
  arsenic tri-iodide;
boron halide compounds, for example:
  boron trifluoride,
  boron trichloride;
ketones, such as:
  acetophenone,
  benzophenone,
  2-acetylnaphthalene,
  benzil,
  benzoin,
  5-benzoylacenaphthene,
  biacene-dione,
  9-acetyl-anthracene,
  9-benzoyl-anthracene,
  4-(4-dimethyl-amino-cinnamoyl)-1-acetylbenzene,
  acetoacetic acid anilide,
  indandione-(1,3),
  (1,3-diketohydrindene),
  acenaphthene quinone-dichloride,
  anisil,
  2,2-puridil and
  furil.
Additional Lewis acids are mineral acids such as:
  the hydrogen halides,
  sulphuric acid and
  phosphoric acid;
organic carboxylic acids, such as:
  acetic acid and the substitution products thereof,
  monochloro-acetic acid,
  dichloroacetic acid,
  trichloroacetic acid,
  phenylacetic acid,
  7-methylcoumarinylacetic acid (4),
  maleic acid,
  cinnamic acid,
  benzoic acid,
  1-(4-diethyl-amino-benzoyl)-benzene-2-carboxylic acid,
  phthalic acid,
  and tetra-chlorophthalic acid,
  alpha-beta-dibromo-beta-formyl-acrylic acid (mucobromic acid),
  dibromo-maleic acid,
  2-bromo-benzoic acid,
  gallic acid,
  3-nitro-2-hydroxy-1-benzoic acid,
  2-nitro phenoxy-acetic acid,
  2-nitro-benzoic acid,
  3-nitro-benzoic acid,
  4-nitro-benzoic acid,
  2-chloro-4-nitro-1-benzoic acid,
  3-nitro-4-methoxy-benzoic acid,
  4-nitro-1-methyl-benzoic acid,
  2-chloro-5-nitro-1-benzoic acid,
  3-chloro-6-nitro-1-benzoic acid,
  4-chloro-3-nitro-1-benzoic acid,
  5-chloro-3-nitro-2-hydroxybenzoic acid,
  4-chloro-1-hydroxy-benzoic acid,
  2,4-dinitro-1-benzoic acid,
  2-bromo-5-nitro benzoic acid,
  4-chlorophenyl-acetic acid,
  2-chloro-cinnamic acid,
  2-cyana-cinnamic acid,
  2,4-dichlorobenzoic acid,
  3,5-dinitro-benzoic acid,
  3,5-nitro-salycylic acid,
  malonic acid,
  mucic acid,
  acetosalycylic acid,
  benzilic acid, butane-tetra-carboxylic acid,
citric acid,
cyano-acetic acid,
cyclo-hexane-dicarboxylic acid,
cyclo-hexane-carboxylic acid,
1,10-dichlorostearic acid,
fumaric acid,
itaconic acid,
levulinic acid,
(levulic acid),
malic acid,
succinic acid,
alpha-bromo stearic acid,
citraconic acid,
dibromo-succinic acid,
pyrene-2,3,7,8-tetra-carboxylic acid,
tartaric acid;
organic sulphonic acids, such as:
4-toluene sulphonic acid, and benzene sulphonic acid,
2,4-dinitro-1-methyl-benzene-6-sulphonic acid,
2,6-dinitro-1-hydroxy-benzene-4-sulphonic acid,
2-nitro-1-hydroxy-benzene-4-sulphonic acid,
4-nitro-1-hydroxy-2-benzene-sulphonic acid,
3-nitro-2-methyl-1-hydroxy-benzene-5-sulphonic acid,
6-nitro-4-methyl-1-hydroxy-benzene-2-sulphonic acid,
4-chloro-1-hydroxy-benzene-3-sulphonic acid,
2-chloro-3-nitro-1-methyl-benzene-5-sulphonic acid and
2-chloro-1-methyl-benzene-4-sulphonic acid.

Suitable polyhydric alcohols may be used in this invention which include, but are not limited to, ethylene glycol; propylene-1,2- and -1,3-glycol; butylene-1,4- and -2,3-glycol; hexane-1,6-diol; octane-1,8-diol; neopentyl glycol; cyclohexanedimethanol(1,4-bis-hydroxymethylcyclohexane); 2-methyl-propane-1,3-diol; diethylene glycol; triethylene glycol; tetraethylene glycol; polyethylene glycols; dipropylene glycol; polypropylene glycols; dibutylene glycol and polybutylene glycols. The unsaturated polyester resins may contain lactones such as $\epsilon$-caprolactone, or hydrocarboxylic acids such as $\omega$-hydroxy-caproic acid. Polyethers containing 2 hydroxyl groups may be used in production of unsaturated polyester resins and may be prepared, e.g., by the polymerization of epoxides, e.g., ethylene oxide, propylene oxide, butylene oxide, tetrahydrofuran, styreneoxide or epichlorohydrin, each with itself, e.g., in the presence of BF$_3$, or by addition of these epoxides, optionally as mixtures or successively, to starting components such as alcohols or amines, e.g., water; ethylene glycol; propylene-1,3- or -1,2-glycol; trimethylol propane; 4,4'-dihydroxydiphenylpropane; aniline; ammonia; ethanolamine or ethylenediamine. The polyethers may be modified with vinyl polymers such as those which may be obtained by polymerizing styrene or acrylonitrile in the presence of polyethers.

The polyester silicate resins may be modified with polyacetals, polyester amides, polyamides, organic diisocyanates, natural polyols, e.g., castor oil and additional products of alkylene oxides with phenoformaldehyde resins or with ureaformaldehyde resins.

The polyester silicate resins may be modified by polymerable oils such as unsaturated fatty acids (or their esters), tung oil, linseed oil, heated linseed oil, soya bean oil, dehydrated castor oil, tall oil, cottonseed oil, sunflower oil, fish oil, perilla oil and safflower oil.

Suitable unsaturated alcohols such as allyl alcohol may be reacted with dibasic acids such as phthalic anhydride, succinic acid, maleic acid, maleic anhydride, itaconic acid and fumaric acid to produce allyl esters which may be polymerized alone or with other polymerizing monomers. Allyl esters such as diethylene glycol bis(allyl carbonate), diallyl maleate, diallyl fumarate, diallyl phthalate, diallyl benzene phosphonate, allyl itaconate and methallyl methacrylate may be used in this invention. Triallyl cyanurate may be reacted with unsaturated polyester resins to produce resins, and may be used as the polymerizing monomer.

Other unsaturated alcohols may be reacted with dibasic acids; these include other polymeric allyl-type alcohols which are alcohols having a double bond of aliphatic character between two carbon atoms, one of which is attached directly to a saturated carbon atom, which, in turn, is attached directly to an alcoholic hydroxyl group, as represented by the general structural formula:

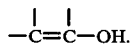

Alcohols embodying this structure may be properly be termed "beta, gamma-olefinic monohydric alcohols". Allyl-type alcohols having a terminal methylene group attached by an olefinic double bond to a carbon atom which is attached directly to a saturated carbinol carbon are represented by the formula:

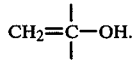

Any suitable salt-forming compound may be utilized to react with the alkali metal radical in the alkali metal silicate to produce polyester silicate resinous products. Suitable salt-forming compounds include mineral acids such as sulfuric acid, hydrochloric acid, phosphoric acid, and nitric acid, organic acids, such as acetic acid, hydrogen-containing acid salts such as sodium hydrogen sulfate and potassium hydrogen sulfate, organic acid halides, organic acid sulfates and mixtures thereof.

Any suitable polymerizing monomer may be used with the unsaturated polyester resin such as, but not limited to, vinyl monomers, allyl esters, triallyl cyanurate and mixtures thereof.

Styrene is the preferred polymerizing monomer and may be used alone or in combination with vinyl acetate. Other vinyl monomers may be used such as acrylic acid compounds and esters, vinyl toluene, divinyl benzene, acrylonitrile, methacrylonitrile, etc.

Activators and promoters, used in conjunction with the initiators such as cobalt which, in the form of its ethyl hexanoate or naphthenate salt, is a good, general-purpose activator for use with ketone peroxides, may be added to the unsaturated polyester resin. Concentration as low as 30 ppm of cobalt metal will activate a system. Other activators may be added to the unsaturated polyester silicate resins such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

An inhibitor, such as p-tert-butyl catechol, hydroquinone, p-nitrose dimethylaniline or similar compounds which will increase the lifetime of the unsaturated polyester resin, may be added to the unsaturated polyester resin.

Any suitable initiator which will promote the copolymerization of a solution of an unsaturated linear polymer in a liquid monomer may be used in this invention. The controlled polymerization of unsaturated polyester silicate monomer mixture, in order to yield fully cured solids, usually requires the use of an initiator.

Any suitable free-radical initiator, such as organic and inorganic peroxides, azo compounds, alkali metal persulfates, ammonium persulfate and mixtures thereof, may be used. The fact that the action of organic peroxide can be modified by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauroyl peroxide, benzoyl peroxide, tert-butyl perbenzoate, di-tert-butyl diperphthalate and mixtures thereof.

Promoters used with acyl peroxide include tertiary dialkyl aryl amines, such as diethyl aniline, and aliphatic thiols, as for example, lauryl mercaptan. Concentrations used are most often in the range of 0.05% to 0.5% of active substance. Promoters usually are strong reducing agents and initiators are strong oxidizing agents.

Suitable alkali metal persulfates include potassium and sodium persulfate. Redox systems may also be utilized in this invention.

Any suitable organic amine may be used in this invention; however, polyamines are preferred.

The polyamines to be used in this invention include those organic materials possessing a plurality of amino hydrogen, e.g., a plurality of:

groups wherein N is an amino nitrogen. These include the aliphatic, cycloaliphatic, aromatic or heterocyclic polyamines as well as derivatives thereof as long as the derivatives still contain the necessary amino hydrogen.

Suitable examples of these materials include, among others, the aliphatic polyamines such as, for example, ethylenediamine; diethylenetricamine; triethylenetetramine; tetraethylenepentamine; 1,4-diaminobutane; 1,3-diaminobutane; hexamethylenediamine; 3-(N-isopropylamine) propylamine; N,N'-diethyl-1,3-propanediamine; hexaproplene-heptamine; penta(1-methyl-propylene hexamine); tri(1,2,2-trimethylethylene) tetramine; tetra(1,3-dimethylpropylene) pentamine; penta-(1,5-dimethylamylene) hexamine; penta(1,2-dimethyl-1-isopropylethylene) hexamine and N,N'-dibutyl-1,6-hexanediamine.

Suitable aliphatic polyamines are the alkylene polyamines of the formula:

wherein R is an alkylene radical or a hydrogen-substituted alkylene radical, and n is an integer of at least one, there being no upper limit to the number of alkylene groups in the molecule.

The aliphatic polyamines are preferred which comprise the polyethylene polyamines of the formula:

wherein n is an integer varying from about 2 to 8. A mixture of high-molecular-weight polyethylene polyamines and diethylenetriamine is especially preferred.

Suitable polyamines include polymeric polyamines, such as may be obtained by polymerizing or copolymerizing unsaturated amines, such as allyl amine or diallyl amine, alone or with other ethylenically unsaturated compounds. Alternatively, such polymeric products may also be obtained from polymers or copolymers having groups reactive with amines such as, for example, aldehyde groups, as present on acrolein and methacrolein polymers, and reacting these materials with monomeric amines to form the new polymeric polyamines. Polymeric amines can also be formed by preparing polymers containing ester groups, such as, for example, a copolymer of octadecene-1 and methylacrylate, and then reacting this with a polyamine so as to effect an exchange of an ester group for an amide group and leave the other amine group or groups free. Polymers of this type are described in U.S. Pat. No. 2,912,416.

Suitable polyamines include the polyamines possessing cycloaliphatic ring or rings, such as for example:
1-cyclohexylamine-3-aminopropane;
1,4-diaminocyclohexane;
1,3-diaminocyclopentane;
di(aminocyclohexyl) methane;
di(aminocyclohexyl) sulfone;
1,3-di(aminocyclohexyl) propane;
2,4-diaminocyclohexane;
N,N'-diethyl-1,4-diaminocyclohexane, and the like.

Preferred members of this group comprise those polyamines having at least one amino or alkyl-substituted amino group attached directly to a cycloaliphatic ring containing 5 to 7 carbon atoms.

Other suitable polyamines comprise the aminoalkyl-substituted aromatic compounds such as, for example, di(amino-ethyl) benzene, di(aminomethyl) benzene, tri(aminoethyl) benzene, tri(aminobutyl) naphthalene and the like.

Suitable polyamines also include the organo-metallic compounds, such as those having a silicon or boron atom or atoms linked to amino or substituted amino groups. The compounds may also be those organo-metallic compounds wherein the amino group or substituted amino groups are attached to carbon, such as in the alkosilylpropylamines like triethoxy silylpropylamines.

Other suitable polyamines include the N-(aminoalkyl) piperazines, such as, for example, N-aminobutylpiperazine; N-aminoisopropyl-3-butoxypiperazine; N-aminoethylpiperazine; 2,5-dioctyl-N-aminoisobutylpiperazine and the like.

Another group of suitable materials is obtained by reacting the above-described polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidal ether, chlorophenyl glycidyl ether, naphthyl glycidyl ether, diacetate of monoglycidyl ether of glycerol, dipropionate of the monoglycidyl ether of glycerol, epichlorohydrin, 1,2-dicylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like. This reaction between polyamines and monoepoxide is effected merely by bringing the components together in proper proportion. The adducts are obtained when a mol of the polyamine is reacted with not more than one mol of monoepoxide. The excess amine can be retained or can be removed by distillation. Examples of the monoepoxidepolyamine reaction products include, among others, N(hydroxy-propyl) diethylenetriamine (reaction product of propylene oxide and diethylenetriamine and N(2-hydroxy-3-phenoxypropyl) diethylenetriamine (reaction product of phenyl glycidyl ether and diethylenetriamine).

A group of related materials are those soluble fusible products obtained by reacting a polyepoxide with a monoamine. Examples of polyepoxides that may be used include any of the present invention. Examples of monoamines include any of those noted above for use in the compositions of the present invention. Examples of the monoamines include, among others, secondary amines such as dimethylamine, diethylamine, dipropylamine, dibutylamine, di(tert-butyl) amine, dinonylamine, dicyclohexylamine, diallylamine, dibenzylamine, methylethylamine, ethylcyclohexylamine, and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Other examples include the soluble reaction products of polyepoxides and polyamines and salts thereof, such as described in U.S. Pat. Nos. 2,640,037 and 2,643,239.

Still other derivatives that may be employed include those obtained by reacting the polyamines with acrylates, such as methyl acrylate, ethyl acrylate, methyl methacrylates and the like. In this case, there is an exchange of the ester linkage for an amide linkage, one of the polyamine nitrogen being involved in the said amide linkage.

Another suitable group of derivatives that may be used in the process of the invention include those soluble and fusible products obtained by reacting the polyamines noted above with unsaturated nitriles, such as acrylonitrile. Examples of such products include the cyanoethylated diethylenetriamine, cyanoethylated triethylenetetramine, cyanoethylated hexamethylenediamine, cyanoethylated 1,3-propanediamine and cyanoethylated 1,3-diaminocyclohexane. Preferred species of the cyanoalkylated polyamines include those of the formula:

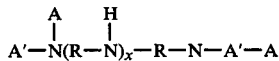

wherein x represents an integer in the range of 0 through 3 and A and A' represent a member selected from the group consisting of hydrogen and cyanoethyl radicals, and further characterized in that the amine has at least one cyanoethyl group and at least one non-tertiary amino group in the molecule. The preferred members of this group comprise the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula:

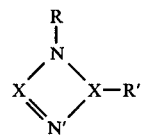

wherein X is an organic radical and, preferably, an alkylene radical, R is a long-chain hydrocarbon radical, and preferably one containing at least 12 carbon atoms, and R' is an organic radical containing an amine or amine-substituted group. Particularly preferred members of this group are those obtained by reacting any of the above-described polyamines with long-chain monocarboxylic acids, such as those containing at least 12 and, preferably, 16 to 30 carbon atoms, such as, for example, palmitic acid, pentadecanoic acid, 4-ketomyristic acid, 8,10-dibromostearic acid, margaric acid, stearic acid, alphachlorostearic acid, linoleic acid, oleic acid, dehydroxystearic acid, arachidic acid, cluopanodonic acid, behenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about 0.3 to 0.7 to 1, and, preferably, about 0.3 to 0.5 to 1. The temperature employed preferably varies from about 100° C. to 250° C.

Suitable polyamines include the aromatic polyamines, especially those having at least two —NH$_2$ groups attached to aromatic ring or rings and containing up to 25 carbon atoms.

Suitable polyamines include the sulfur- and/or phosphorous-containing polyamines such as may be obtained by reacting a mercaptan- or phosphine-containing active hydrogen with an epoxy halide to form a halohydrin, dihydrochlorinating and then reacting the resulting compound with a polyamine; N-(3-ethyl-thio-2-hydropropyl) diethylenetriamine may be prepared, for example, by reacting ethyl mercaptan with epichlorohydrin, dihydrochlorinating and then reacting the resulting epoxy compound with diethylenetriamine. Suitable examples of such compounds include, among others:

N-(3-butylthio-2-hydroxypropyl) triethylenetetramine,
N-(4-phenylthio-3-hydrobutyl) pentamethylenetetramine,
N-(4-cyclohexylthio-3-hydrobutyl) ethylenediamine,
N-(4-cyclohexylthio-3-hydrobutyl) ethylenediamine,
N-(3-cyclohexylthio-2-hydropropyl) hexamethylenediamine,
N-(3-diphenylphosphino-2-hydroxypropyl) triethylenetetramine,
N-(3-dicyclohelylphosphino-2-hydroxpropyl) pentamethylenetetramine,
N-(3-dididecylphosphino-2-hydroxylhexyl) diethylenetriamine, and N-(3-allylthio-2-hydroxypropyl) hexamethylenediamine.

The N-(allylthio-hydroxyallyl) aliphatic and aromatic polyamines, the N-(cycloalkylthiohydroxy-alkyl) aliphatic and aromatic polyamines and the N-(arylthiohydroxyalkyl) aliphatic and aromatic polyamines may also be used in this invention. Preferred phosphorus-containing curing agents include the N-(dialkylphosphinohydroxyalkyl) aliphatic and aromatic polyamines, the N-(dicycloalkyl phosphinohydroxyalkyl) aliphatic and aromatic polyamines and the N-(diaryl-phosphinohydroxyalkyl) aliphatic and aromatic polyamines.

Suitable polyamines include the polyamines of the formula:

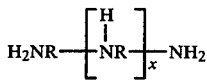

wherein x is an integer of 0 to 10 and R is bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms.

Salts of polyamines and fatty acid (e.g., stearic, linoleic acid, decanoic acid, lauric acid, oleic acids and the like) may be used in this invention.

Aminoplasts, phenoplasts, aminoplast silicates, phenoplast silicates, aminosilicate compounds and mixtures thereof may be used. These types of resins usually require curing at high temperatures and, in some cases, a small amount of an acid catalyst.

The polyester silicate resinous products of this invention will react with polyisocyanates such as crude MDI to produce resinous products which may be used as adhesives, putty caulking agents, etc., and foams which may be used for thermal and sound insulation.

Any suitable organic polyisocyanate may be used according to the invention, including aliphatic, cycloaliphatic, aralphatic, aromatic and heterocyclic polyisocyanates and mixtures thereof. Suitable polyisocyanates which may be employed in the process of the invention are exemplified by the organic diisocyanates which are compounds of the general formula:

$$O=C=N-R-N=C=O$$

wherein R is a divalent organic radical such as an alkylene, aralkylene or arylene radical. Such suitable radicals may contain, for example, 2 to 20 carbon atoms. Examples of such diisocyanates are:
 tolylene diisocyanate,
 p,p'-diphenylmethane diisocyanate,
 phenylene diisocyanate,
 m-xylylene diisocyanate,
 chlorophenylene diisocyanate,
 benzidene diisocyanate,
 naphthylene diisocyanate,
 decamethylene diisocyanate,
 hexamethylene diisocyanate,
 pentamethylene diisocyanate,
 tetramethylene diisocyanate,
 thiodipropyl diisocyanate,
 propylene diisocyanate, and
 ethylene diisocyanate.

Other polyisocyanates, polyisothiocyanates and their derivatives may be equally employed. Fatty diisocyanates are also suitable and have the general formula:

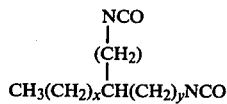

where $x+y$ totals 6 to 22 and z is 0 to 2, e.g., isocyanastearyl isocyanate.

It is generally preferred to use commercially readily-available polyisocyanates, e.g., tolylene-2,4- and -2,6-diisocyanate and any mixtures of these isomers, commercially known as "TDI"; polyphenylpolymethylene-isocyanates obtained by aniline-formaldehyde condensation followed by phosgenation, commercially known as "crude MDI"; and modified polyisocyanate containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates or aniline or anilines alkyl-substituted on the nucleus with formaldehydes or ketones may be used in this invention. Solutions of distillation residues accumulating during the production of tolylene diisocyanates, diphenyl methane diisocyanates, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4-; and methylene-bis-(cyclohexyl-4,4'-) diisocyanate may be used in this invention. Suitable polyisocyanates which may be used according to the invention are described by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also be used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and, preferably, from about 1,000 to about 6,000, e.g., polyesters, polyethers, polythioethers, polyacetals, polycarbonates or polyester amides containing at least 2, generally from 2 to 8, but, preferably, dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated. Examples include: Succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used, such as, for example, ethylene glycol, propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetra ethylene glycol; polyethylene glycols; dipropylene glycol; polypropylene glycols; dibutylene glycol and polybutylene glycols. The polyesters may also contain a proportion of carboxyl end groups. Polyesters of lactones such as c-caprolactone, or hydroxycarboxylic acid such as c-hydroxycaproic acid may also be used.

The polyethers with at least 2, generally from 2 to 8 and, preferably, 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$ or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane; aniline; ammonia, ethanolamine or ethylenediamine; sucrose polyethers, such as those described in German Auslegeschrifren Nos. 1,176,358 and 1,064,938, may also be used according to the invention. It is frequently preferred to use polyethers which contain, predominantly, primarily OH groups (up to 90% by weight, based on the total OH groups contained in the polyether). Polyethers modified with vinyl polymers such as those which may be obtained by polymerizing styrene or acrylonitrites in the presence of polyethers (U.S. Pat. Nos. 3,383,351; 3,304,273; 3,523,093 and 3,110,695; and German Pat. No. 1,152,536), and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4'-dihydroxydiphenylmethylmethane, hexanediol and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, wood particles, cellulose, modified cellulose, carbohydrates and starches, may also be used. Additional products of alkylene oxides with phenol formaldehyde resins or with urea-formaldehyde resins are also suitable for the purpose of the invention.

Organic hydroxyl silicate compound as produced in U.S. Pat. No. 4,139,549 may also be used in this invention to react with the polyisocyanates.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 and pages 198 to 199; and in Kunstsoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing polyurethane silicate resinous or foamed products. The following are examples of polyisocyanate curing agents and activators:

1. Water.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of alkali metal oxide to $SiO_2$ is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating may be required to start the curing reaction.
6. Water containing 20% to 70% by weight of silica sol.
7. Activators (catalysts) which act as curing agents and are added to the polyurethane or polyurethane prepolymer in the amount of 0.001% to 10% by weight. They may be added in water.
    (a) Tertiary amines, e.g., triethylamine; tributylamine; N-methyl-morpholine; N,N,N',N'-tetramethylenediamine; 1,4-diazobicyclo(2,2,2)-octane; N-methyl-N'-dimethylaminoethyl piperazine; N,N-dimethylbenzylamine; bis(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine; and 1,2-dimethylimidazole. Suitable tertiary amine activators which contain hydrogen atoms which are reactive with isocyanate groups include, e.g., triethanolamine;triisopanolamine; N,N-dimethylethanolamine; N-methyldiethanolamine; N-ethyldiethanolamine; and their reactive products with alkylene oxides, e.g., propylene oxide and/or ethylene oxide and mixtures thereof.

(b) Organo-metallic compounds, preferably organotin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.

(c) Silaamines with carbon-silicon bonds are described, e.g., in British Pat. No. 1,090,589, may also be used as activators, e.g., 2,2,4-trimethyl-1,2-silamorpholine or 1,3-diethylaminoethyl-tetramethyldisiloxane.

(d) Other examples of catalysts which may be used according to the invention, and details of their action are described in Kunststoff-Handbuch, Volume VII, published by Vieweg and Hochtlen, Carl-Hanser-Verlag, Munich, 1966, on pages 96 and 102.

8. Water containing 1% to 10% by weight of bases which contain nitrogen such as tetraalkyl ammonium hydroxides.

9. Water containing 1% to 10% by weight of alkali metal hydroxides such as sodium hydroxide; alkali metal phenolates such as sodium phenolate or alkali metal alcoholates such as sodium methylate.

10. Water containing sodium polysulfide in the amount of 1% to 10% by weight.

11. Water containing 20% to 70% by weight of a water-binding agent, being capable of absorbing water to form a solid or a gel, such as hydraulic cement, synthetic anhydrite, gypsum or burnt lime.

12. Mixtures of the above-named curing agents. Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid. or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308. These additives are, preferably, used in quantities of up to 20%, based on the reaction mixture.

Negative catalyst, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethylphosphate or ammonium phosphate and polyphosphates, stabilizers against aging and weathering, plasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich, 1966, on pages 103 to 113. The halogenated paraffins and inorganic salts of phosphoric acid are the preferred fire-retarding agents.

Aqueous solutions of silicates may be prepared in the form of 25% to 70% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are, preferably, produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate; tris(2,3-dichloropropyl)phosphate; polyoxypropylenechloromethylphosphonate; cresyldiphenylphosphate; tricresylphosphate; tris-(betachloroethyl)-phosphate; tris-(2,3-dichloropropyl)-phosphate; triphenylphosphate; ammonium phosphate; perchloroinated diphenyl phosphate; perchlorinated terephenyl phosphate; hexabromocyclodecane; tribromophenol; dibromopropyldiene; hexabromobenzene; octabromodiphenylether; pentabromotoluol; polytribromostyrol; tris(bromocresyl)-phosphate; tetrabromobisphenol A; tetrabromophthalic acid anhydride; octabromodiphenyl phosphate; tri(dibromopropyl)-phosphate; calcium hydrogen phosphate; sodium or potassium dihydrogen phosphate; disodium or dipotassium hydrogen phosphate; ammonium chloride, phosphoric acid; polyvinyl chloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane silicate products.

The ratios of the essential reactants and optional reactants which lead to the polyurethane silicate resinous or foamed product of this invention may vary, broadly speaking, with ranges as follows:

(a) 1 to 95 parts by weight of a polyester silicate resinous product, preferably with free hydroxyl group and produced by the process of this invention.

(b) 50 parts by weight of polyisocyanate, polyisocyanate or isocyanate-terminated polyurethane prepolymer;
(c) up to 20% by weight of a foam stabilizer;
(d) up to 50% by weight of a chemically inert blowing agent, boiling within the range of from −25° C. to 80° C.;
(e) up to 10% by weight of an activator;
(f) up to 200 parts by weight of a water-binding agent;
(g) up to 95 parts by weight of a polyol;
(h) up to 5% by weight of an emulsifier;
(i) up to 50% by weight of a curing agent.

Percentages are based on the weight of the reactants, polyester resinous product, polyol and polyisocyanate.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, the isocyanate-terminated polyurethane prepolymer may be sulphonated. It is usually sufficient to react the isocyanate-terminated polyurethane prepolymer with concentrated sulphuric acid or oleum of sulfur trioxide in order to produce a sulphonated poly(urethane silicate) prepolymer containing the sulphonic group in the amount of 3 to 100 milli-equivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester resinous products.

The sulphonated isocyanate-terminated polyurethane prepolymer can be directly mixed with an aqueous silicate solution, in which case the corresponding metal salt is formed in situ. The sulphonated polyurethane prepolymer may be completely or partly neutralized at the onset by the addition of amines metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar or hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0 to 200% by weight, based on the weight of the reactants. When a water-binding agent is added and when the curing agent is an aqueous alkali metal silicate solution, a halogen- or phosphorus-containing compound or mixture thereof may be added in the amount of 1% to 30% by weight, based on the weight of the reactants.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, published by Kirk-Othmer, pages 684 to 710, of the type of cement which may be used in the production of this invention and which are incorporated herein by reference.

Blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details of the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with copolymer or polyol or can be reacted with the polyisocyanate to produce a polyurethane silicate prepolymer. In that case, the function of the polyisocyanate is that of a non-volatile hardener whose reaction product is a high-molecular weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The polyurethane silicate plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required in order to initiate foaming. The blowing agent may be added to the polyisocyanate or polyester resinous product.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor-treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as construction materials due to their toughness and stiffness, yet they are still elastic. They are resistant to tension and compression and have a high-dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers.

The foamed or solid concrete produced by reaction of the organic broken-down lignin cellulose polymer, polyol and polyisocyanate with a water-binding component may be used as surface coatings having good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire resistance. The amount of water-binding component used varies greatly, depending on the type of product desired, up to 200% by weight, based on weight of reactants. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell-shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, aluminosilicates cements, basalt wool or powder, glass fibers, carbon fibers, graphite, carbon black, Al-, Fe-, Cri- and Ag-powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the Components (a), (b) and (c) in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: Polystyrene, polyethylene, polypropylene, polyacrylonitrile, polybutadiene, polyisoprene, polytetrafluoroethylene, aliphatic and aromatic polyesters, melamine, urea, phenol resins, phenol silicate resins, polyacetal resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is, preferably, filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked up in a kneader.

In many cases, the polyurethane silicate resinous and foamed products produced by the invention are soluble in organic solvents and may be used as a tough coating agent for wood and metal. The mixtures of the invention are also suitable for use as impregnating agents for finishing fibers. The mixtures may also be extruded through dies or slots and be converted into fibers and foils. These fibers and foils may be used for producing synthetic incombustible paper or fleeces.

When the polyester silicate resinous product produced by the process of this invention and polyisocyanate are combined with expanded clay and an alkali metal silicate solution, a very good concrete is obtained which can, for example, be used as panels in the construction field. In this case, the foam material (expanded clay) plays the part of the binding material.

Epihalohydrins may be used in this invention, such as epichlorohydrin, epibromohydrin, methyl epichlorohydrin and mixtures thereof. The preferred epihalohydrin is epichlorohydrin.

The object of this invention is to provide a novel process for the production of polyester silicate resinous product containing an excess amount of oxidated silicon compound which improves its resistance to organic solvents and increases its strength. Another object is to produce a novel polyester silicate resinous product. Another object is to produce unsaturated polyester silicate resinous products which will react with polymerizable organic compounds to produce solid polyester silicate resinous products. Still another object is to produce polyester silicate resinous products which will react chemically with polyisocyanates, polyisothiocyanates and isocyanate-terminated polyurethane prepolymers to produce foamed and solid polyurethane resinous products.

DETAILED DESCRIPTION OF THE INVENTION

I have discovered that a novel polyester silicate resinous product may be produced by mixing 1 to 50 parts by weight of an oxidated silicon compound, 10 to 50 parts by weight of an organic epoxide compound, 10 to 50 parts by weight of a polycarboxylic acid and/or a polycarboxylic acid anhydride and 0.5 to 5 parts by weight of a Lewis acid; then heating the mixture from just below the boiling temperature up to 250° C. while agitating for from 30 minutes to 4 hours.

The reaction of this invention may take place under any suitable physical conditions. While most of the reactions will take place at ambient pressure, in certain cases, a pressure either lower than, or above, ambient pressure may give best results. It may be preferable in certain cases to use a temperature above the organic epoxide compound's boiling temperature after a partial reaction has taken place in order to speed up the chemical reaction. The temperature usually ranges between the boiling temperature of the epoxide compound and 250° C. when the organic epoxide compound is a gas, elevated pressures are necessary. The components may be mixed in any suitable order, usually simultaneous mixing of the components being preferred.

The polyester silicate resinous product may be modified by the addition of the following components to Components (a), (b), (c) and (d) when 10 to 50 parts by weight of a polycarboxylic acid and/or a polycarboxylic acid anhydride are used:

(a) up to 25 parts by weight of an organic polyhydroxyl compound;
(b) up to 25 parts by weight of an organic polyamine compound;
(c) up to 100 parts by weight of a polyisocyanate or polyisothiocyanate;
(d) up to 100 parts by weight of an isocyanate-terminated polyurethane prepolymer;
(e) up to 25 parts by weight of an epichlorohydrin;
(f) up to 50% by weight of the polycarboxylic acid and/or polycarboxylic acid anhydride may be replaced with a vegetable oil;
(g) up to 25 parts by weight of a vinyl monomer, percentage based on weight of Components (a), (b), (c) and (d).

The unsaturated polyester resinous product will react with vinyl monomers in the presence of an initiator. The vinyl monomer may be added in an amount up to 50% by weight, percentage based on the unsaturated polyester silicate resinous product. Any suitable peroxide initiator may be used, usually an amount of 0.2% to 0.5% by weight being a catalytic amount, percentage based on weight of the unsaturated polyester silicate resinous product. Any suitable peroxide activator may be used to activate the peroxide initiator, in an amount of 30 to 100 ppm.

The polyester resinous products of this invention will react with polyisocyanates and polyisothiocyanates to produce foamed and solid polyurethane silicate resinous products. The reactions will take place in any suitable condition. The reactions will usually take place at ambient temperature and pressure, but in certain cases, an elevated or lowered temperature or pressure is preferred.

Water-binding agents may be added to the unsaturated polyester silicate-vinyl monomer solution, up to 300%, percentage based on unsaturated polyester silicate-vinyl monomer solution, and to the polyester silicate-polyisocyanate mixture.

DESCRIPTION OF PREFERRED EMBODIMENTS

My invention will be illustrated in greater detail by the specific examples which follow, it being understood that these preferred embodiments are illustrative of, but not limited to, procedures which may be used in the production of polyester products. Parts and percentages are by weight unless otherwise indicated.

Example 1

About 20 parts by weight of a fine granular hydrated silica, 18 parts by weight of propylene oxide, 14 parts by weight of maleic anhydride, 20 parts by weight of adipic acid and 1 part by weight of 6 N hydrochloric acid are mixed while keeping the temperature below the boiling temperature of the reactants; then the temperature is slowly increased to 250° C. while agitating for from 30 minutes to 4 hours, thereby producing polyester silicate containing excess hydrated silica as a filler.

Example 2

Example 1 is modified by adding 5 parts by weight of ethylenediamine with the other compounds of Example 1.

Example 3

Example 1 is modified by adding 5 parts of weight of epichlorohydrin with the other components of Example 1.

Other epihalohydrins may be added in place of epichlorohydrin, such as epibromohydrin, methyl epichlorohydrin and mixtures thereof.

Example 4

Example 1 is modified by adding about 5 parts by weight of ethylene glycol with the other components of Example 1.

Other organic hydroxyl compounds may be used in place of ethylene glycol, such as propylene glycol, diethylene glycol, butylene glycol, glycerol, trimethylol propane, trimethylol propane, trimethylol ethane and mixtures thereof.

Example 5

Example 1 is modified by adding 1 part by weight of diethylene triamine, 1 part by weight of epichlorohydrin, 1 part by weight of linseed oil and 1 part by weight of propylene glycol with the other components of Example 1.

Example 6

About 10 parts by weight of fine granular polysilicic acid and 2 parts by weight of phosphoric acid are mixed, then 20 parts by weight of propylene oxide, 15 parts by weight of maleic anhydride, 5 parts by weight of phthalic anhydride and 10 parts by weight of adipic acid are added, then agitated at a temperature below the boiling temperature of the reactants and at ambient pressure. The temperature is gradually increased up to 250° C. while agitating for from 30 minutes to 4 hours, thereby producing a polyester silicate resinous product.

Example 7

About 40 parts by weight of moist polysilicic acid, containing about 50% water and 3% sulfuric acid, are mixed with 20 parts by weight of phthalic anhydride and 5 parts by weight of maleic anhydride, then heated to above the melting temperature of the polysilicic acid, while agitating until most of the water is evaporated, then mixed with 10 parts by weight of propylene oxide and 5 parts by weight of glycerol and agitated while heating and slowly elevating the temperature up to 250° C. over a period of from 30 minutes to 4 hours, thereby producing polyester silicate resinous product.

Example 8

About 1000 parts by weight of a salt-free silica sol containing 15% silicic acid in the form of very fine particles are mixed with 150 parts by weight of glycerol, then heated under reduced pressure while agitating until all of the water is removed, thereby producing an organosol; the organosol is then mixed with 100 parts by weight of phthalic anhydride, 30 parts by weight of isophthalic acid, 20 parts by weight of adipic acid, 50 parts by weight of fumeric acid, 3 parts by weight of 6 N hydrochloric acid and 30 parts by weight of propylene oxide; all this is mixed at ambient temperature and pressure. The mixture is agitated for from 30 minutes to 4 hours while heating and slowly elevating the temperature up to 250° C., thereby producing polyester silicate resinous product.

Other polyhydric alcohols may be used in place of glycerol or with glycerol, such as pentaerythritol, di- and tripentaerythritol, trimethylolethane and propane and mixtures thereof.

Example 9

About 10 parts by weight of a fine granular silicoformic acid, 10 parts by weight of maleic anhydride, 3 parts by weight of phthalic anhydride, 10 parts by weight of adipic acid and 1 part by weight of 6 N hydrochloric acid are mixed, then 15 parts by weight of propylene oxide and 20 parts by weight of tolylene diisocyanate are added at ambient temperature and pressure. The mixture is agitated and the temperature is slowly elevated by heating until the mixture solidifies, thereby producing a polyurethane silicate resinous product.

Other polyisocyanates and polyisothiocyanates may be used in place of tolylene diisocyanate, such as polyphenyl polymethylene-isocyanate, methylene bis-phenyl diisocyanate, 4,4-diphenylmethylene diisocyanate and mixtures thereof.

Isocyanate-terminated polyurethane prepolymers may be used in place of tolylene diisocyanate such as polyphenyl-polymethylene-isocyanates with an NCO content of about 31 reacted with 5% acetic acid, polyphenyl-polymethylene-isocyanates with an NCO content of about 31 reacted with 1% propylene glycol, toluene diisocyanate with polypropylene glycol (mol. wt. 500) in an NCO/OH ratio of 25:1 and mixtures thereof.

Example 10

About 100 parts by weight of the polyester silicate as produced in Example 1 are mixed with 50 parts by weight of styrene containing an inhibitor such as hydroquinone at about 90° C., thereby producing a liquid unsaturated polyester silicate resinous product. About 0.5 part by weight of cobalt naphthanate is added and mixed in the unsaturated polyester silicate resinous product, then about 0.5 part by weight of methyl ethyl ketone peroxide is thoroughly mixed in and the resin is applied to layers of fiberglas at about 70° F. The resin hardens in about 15 to 60 minutes, thereby producing a rigid polyester silicate resinous panel.

Example 11

About 100 parts by weight of the polyester silicate, as produced in Example 6 at 80° C. to 90° C., are mixed with 35 parts by weight of styrene and 15 parts by weight of vinyl acetate, thereby producing a liquid unsaturated polyester silicate resinous product. About 0.5 part by weight of cobalt naphthanate and 0.5 part by weight of benzyol peroxide are mixed with the liquid unsaturated polyester silicate resinous product and then poured into a mold for producing knobs. The resin hardens, thereby producing solid polyester silicate resinous products.

Example 12

Example 11 is modified by adding 300 parts by weight of Portland cement and 100 parts by weight of water to the liquid unsaturated polyester silicate resinous product before adding the activator and peroxide catalyst, thereby producing a polyester silicate concrete product.

Other water-binding agents may be used in place of Portland cement, such as other hydraulic cements, burnt lime, gypsum and synthetic anhydrites.

Example 13

About 100 parts by weight of the polyester silicate resinous product listed below, and about 100 parts by weight of a polyisocyanate listed below are mixed and reacted between ambient temperature and 50° C., thereby producing a polyurethane silicate resinous product.

| Example | Resin from: | Polyisocyanate |
| --- | --- | --- |
| a | Example 1 | Tolylene diisocyanate; |
| b | Example 3 | Polyphenyl-polymethylene isocyanate with an NCO content of about 31; |
| c | Example 4 | Methylene bis-phenyl diisocyanate; |
| d | Example 6 | 4,4-diphenylmethylene diisocyanate; |
| e | Example 7 | Equal parts by weight of tolylene diisocyanate and polyphenyl-polymethylene isocyanates with an NCO content by weight of about 31. |

Example 14

Example 13 is modified by adding 20 parts by weight of trichlorotrifluoroethane, 0.2 part by weight of tin octoate, 1 part by weight of triethylenediamine, and 1 part by weight of a silicone surfactant (L-5420 produced by Union Carbide), thereby producing a foamed polyurethane silicate resinous product in Example 13.

Example 15

About 100 parts by weight of the liquid unsaturated polyester silicate-styrene monomer, as produced in Example 10, 50 parts by weight of aqueous sodium silicate containing about 55% solids ($SiO_2:Na_2O$ ratio of 1.6:1), 0.5 part by weight of tin octoate, 1 part by weight of a silicone surfactant (L-5420 produced by Union Carbide), 20 parts by weight of trichlorofluoromethane, 100 parts by weight of 4,4-diphenyl methylene diisocyanate and 0.5 part by weight of benzoyl peroxide are thoroughly mixed. The mixture begins to expand in 15 to 120 seconds, thereby producing a foamed rigid polyurethane silicate product.

Example 16

Example 15 is modified wherein 100 parts by weight of Portland cement are added with the liquid unsaturated polyester silicate-styrene monomer or the polyisocyanate or both, thereby producing a polyurethane silicate concrete in Example 15.

Example 17

About 20 parts by weight of a fine granular acetic hydrated silica with a pH of 5, 30 parts by weight of propylene oxide, 15 parts by weight of phthalic anhydride, 20 parts by weight of adipic acid and 1 part by weight of Boron fluoride are mixed at ambient temperature and pressure while agitating for about 15 minutes, then the temperature is elevated over a period of 30 minutes to 4 hours, by heating up to 250° C., thereby producing a polyester silicate resinous product.

About 100 parts by weight of the polyester silicate resinous product produced in this Example, 100 parts by weight of an isocyanate-terminated polyurethane prepolymer listed below, 0.5 part by weight of tin octate, 0.5 part by weight of triethanolamine, 0.5 part by weight of triethylenediamine, 20 parts by weight of trichlorotrifluoroethane and 1 part by weight of silicone surfactant are thoroughly mixed at from 17° C. to 30° C. under ambient pressure. The mixture begins to expand in 15 to 120 seconds, thereby producing a foamed polyurethane silicate resinous product.

| Example | Isocyanate-terminated polyurethane prepolymer |
| --- | --- |
| a | Polyphenyl-polymethylene isocyanate with an NCO content of about 31 reacted with 5% acetic acid; |
| b | Polyphenyl-polymethylene-isocyanate with an NCO content of about 31 reacted with 1% propylene glycol; |
| c | 4,4-diphenylmethylene diisocyanate reacted with propylene glycol to produce a prepolymer with an NCO content of about 20% by weight; |
| d | Toluene diisocyanate with polypropylene; glycol (mol. wt. 500) in an NCO/OH ratio of 25:1; |
| e | Toluene diisocyanate with castor oil to produce a prepolymer with an NCO content of about 15%; |
| f | Toluene diisocyanate with a hydroxyl-group-containing polysulfide polymer to produce a prepolymer with an NCO content of about 12%; |
| g | 4,4-diphenylmethylene diisocyanate with a liquid polyepichlorohydrin to produce a prepolymer of about 16% NCO by weight and 25% by weight of a resin extender, polyalphamethyl-styrene, are added, percentage based on weight of prepolymer. |

Example 18

Example 17 is modified by adding 200 parts by weight of Portland cement with the polyester silicate resinous product or the isocyanate-terminated polyurethane prepolymer and 50 parts by weight of water, thereby producing a polyurethane silicate concrete foamed product.

Example 19

About 20 parts by weight of polysilicic acid, containing hydrochloric acid to give a pH of about 5, 10 parts by weight of phthalic anhydride, 10 parts by weight of maleic anhydride, 15 parts by weight of adipic acid and 2 parts by weight of Boron fluoride are added to an autoclave with an agitator, then 15 parts by weight of ethylene oxide are slowly added under a pressure of 50 to 100 psi while agitating, then the temperature is slowly elevated to 250° C. while agitating for from 30 minutes to 4 hours, thereby producing a polyester silicate resinous product.

Other epoxide compounds may be used in place of ethylene oxide such as propylene oxide, styrene oxide, butylene oxide, tetrahydrofuran and mixtures thereof.

Example 20

Example 19 is modified by adding 10 parts by weight of epichlorohydrin with the ethylene oxide.

Example 21

Example 19 is modified by adding 5 parts by weight of propylene oxide with the ethylene oxide.

Example 22

Example 19 is modified by adding 5 parts by weight of ethanolamine with the other components of Example 19.

Example 23

Example 19 is modified by adding 2 parts by weight of propylene diamine, 2 parts by weight of propylene glycol, 2 parts by weight of trichlorobutylene oxide and 2 parts of styrene with the other components of Example 19.

Although specific materials and conditions were set forth in the above Examples, these were merely illustrative of preferred embodiments of my invention. Various other compositions, such as the typical materials listed above, may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended claims.

I claim:

1. The process for the production of foamed polyester silicate resinous products containing an oxidated silicon compound by mixing and reacting the following components;
   (a) an oxidated silicon compound, 1 to 50 parts by weight;
   (b) an organic epoxide compound, 10 to 50 parts by weight;
   (c) an organic polycarboxyl compound selected from the groups consisting of polycarboxylic acid, polycarboxylic acid anhydride and mixtures thereof, 10 to 50 parts by weight;
   thereby producing polyester silicate resinous product then 1 to 100 parts by weight of the polyester silicate resinous product are mixed with 50 parts by weight of a polyisocyanate, up to 50% by weight of a chemically-inert blowing agent, up to 20% by weight of a foam stabilizer, up to 10% by weight of a polyisocyanate activator, up to 50% by weight of a curing agent and up to 5% by weight of an emulsifier, percentage based on the weight of the reactants, and allowed to react, thereby producing a foamed polyurethane silicate resinous product.

2. The product produced by the process of claim 1.

3. The process of claim 1 wherein the polyisocyanate is selected from the group consisting of aliphatic, cycloaliphatic, araliphatic, aromatic and heterocyclic polyisocyanates and mixtures thereof.

4. The process of claim 1 wherein the polyisocyanate is a phosgenated product of aniline-formaldehyde condensation.

5. The process of claim 1 wherein the oxidated silicon compound is selected from the group consisting of hydrated silica, silicoformic acid, polysilicic acid, alkali metal silicate, natural silicate compounds with free silicic acid groups and mixtures thereof.

6. The process of claim 1 wherein the organic epoxide compound is propylene oxide.

7. The process of claim 1 wherein the organic polycarboxyl acid compound is selected from the group consisting of aliphatic, cycloaliphatic, aromatic and heterocyclic polycarboxylic acids and mixtures thereof.

8. The process of claim 1 wherein the organic polycarboxyl acid anhydride compound is selected from the group consisting of aliphatic, cycloaliphatic, aromatic and heterocyclic polycarboxylic acid anhydrides and mixtures thereof.

9. The process of claim 1 wherein the Lewis acid is selected from the group consisting of hydrogen halides, sulphonic acid, phosphoric acid, metal halides and halogenated organic mono-carboxylic acids.

* * * * *